Oct. 13, 1959       H. RUMSEY, JR       2,908,576
PACKAGED SAUSAGE PRODUCT AND METHOD OF MAKING SAME
Filed Dec. 5, 1956       2 Sheets-Sheet 1

INVENTOR
Herbert Rumsey, Jr.
BY
ATTORNEYS

Oct. 13, 1959     H. RUMSEY, JR     2,908,576
PACKAGED SAUSAGE PRODUCT AND METHOD OF MAKING SAME
Filed Dec. 5, 1956     2 Sheets-Sheet 2
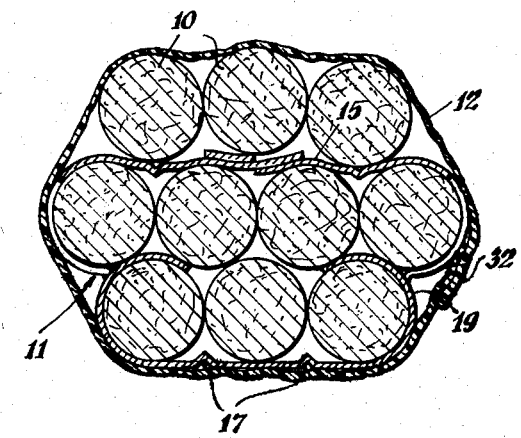
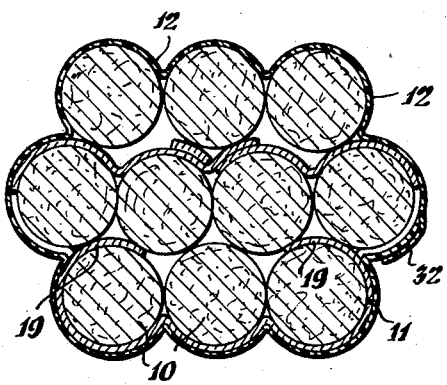
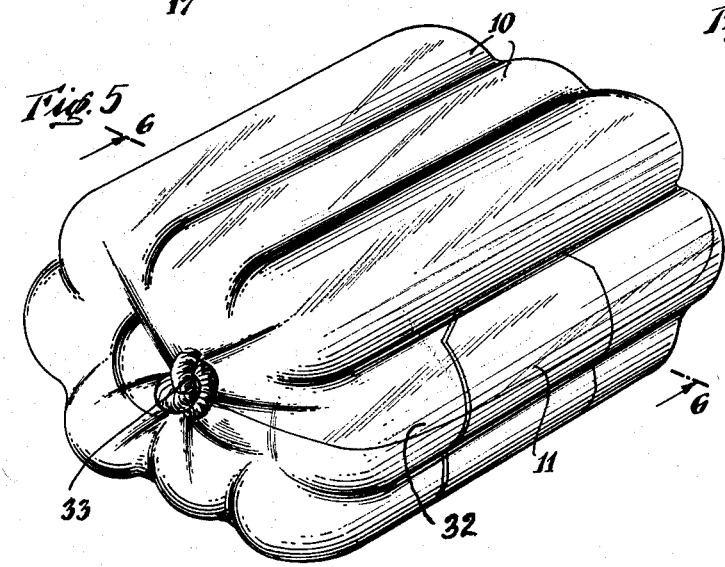
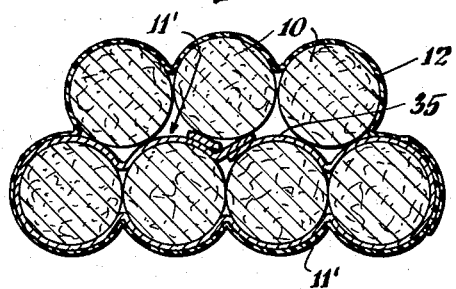
INVENTOR
Herbert Rumsey, Jr.
BY
ATTORNEYS

United States Patent Office 2,908,576
Patented Oct. 13, 1959

2,908,576

PACKAGED SAUSAGE PRODUCT AND METHOD OF MAKING SAME

Herbert Rumsey, Jr., Rochester, N.Y., assignor to W. R. Grace & Co., Cambridge, Mass., a corporation of Connecticut Application December 5, 1956, Serial No. 626,329

8 Claims. (Cl. 99—174)

This invention relates to an improved packaged product having a circular or curved cross-sectional shape, such as a sausage product or frankfurt, together with the method of making the same and improved wrapping band used therein.

In the wrapping of sausage products, frankfurts and other products having a curved, cross-sectional shape, it is difficult to obtain uniform packages of attractive appearance in which the products are arranged in similar parallel, predetermined relationship. Due to the circular or curved cross-sectional shape, products such as this tend to shift with respect to each other and with respect to the surface on which they are wrapped.

It is an object of the present invention to provide an improved packaged product of the type having a circular or curved cross-sectional shape such as sausages or frankfurts together with an improved method of making the same in which the packages present a uniform, attractive appearance with the products arranged in predetermined parallel relationship; in which the package is relatively simple and inexpensive to produce so that it can be made by relatively unskilled operators; in which the packaged product is preserved from undue exposure to the air and in which the package is encased in a flexible, transparent wrapper substantially free from wrinkles in conformity with modern merchandising practices.

A further object of the invention is the provision of an improved wrapping band for use in packaging products of the above-indicated type which may function as a label and which serves to nest the products and retain them in the desired uniform, pre-determined relationship and which at the same time is sufficiently yielding or becomes sufficiently yielding when moistened by contact with the product to conform to the configurations of the wrapped product when an outer wrapping is tightly applied around the product.

In the accompanying drawings:

Fig. 4 is a cross-sectional view of the package with the wrapping material wrapped therearound and showing the package prior to evacuating the air and shrinking the wrapping material;

Fig. 5 is a perspective view of the completed package showing the outer wrapping material after shrinking;

Fig. 6 is a cross-sectional view in the direction of the arrows on the line 6—6 of Fig. 5 showing the completed package;

Fig. 7 is a plan view of a slightly modified form of a wrapping band; and

Fig. 8 is a cross-sectional view of a completed package using the wrapping band shown in Fig. 7.

One form of package embodying my invention is shown in Figs. 5 and 6 and a modified form of package embodying my invention is shown in Fig. 8. In both forms of package the wrapped product 10 is circular in cross-section and I have illustrated the product for which the package is particularly suited, namely, frankfurts. The frankfurts are held in pre-determined arrangement by a wrapping band which extends around all of the frankfurts or around a group of frankfurts at the base of the package. In Figs. 5 and 6 the wrapping band is shown at 11. In Fig. 8 the wrapping band is shown at 11'. The frankfurts thus held in pre-determined arrangement by the wrapping band are encased in an outer wrapper 12 which is impervious to and unaffected by air and by the contents of the package. The wrapping is closed and sealed and the surplus air has been evacuated from the interior thereof whereby the contents of the package are protected from undue exposure to air.

Figure 1:
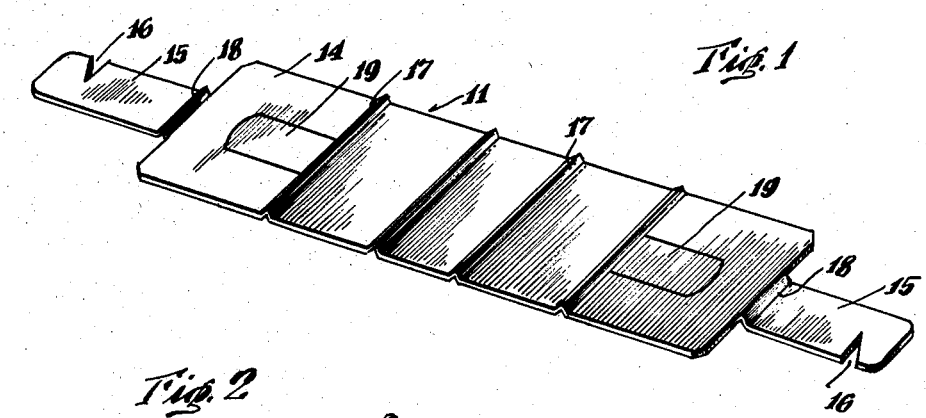
Fig. 1 is a perspective view of a wrapping band embodying certain features of my invention and which may be used in making a package in accordance with my invention.

A fuller understanding of my improved package will be obtained by referring to the method of making the package. In making my package, I first provide a wrapping band, such as shown at 11 in Fig. 1, of the proper size and design required for the particular arrangement of package that it is desired to make. The wrapping band shown in Fig. 1 is particularly suited for making a package of the type shown in Figs. 5 and 6 in which ten frankfurts are encased within the package with three frankfurts arranged in parallel relationship at the bottom row, four frankfurts arranged in parallel relationship in the intermediate row and three frankfurts arranged at the top row.

The wrapping band is made of a material of sufficient strength and stiffness to serve to support the frankfurts and hold them in the desired pre-determined relationship for packaging. At the same time the material should be sufficiently yielding or should be of such character that it will become yielding so as to conform with the curvature of the frankfurts as a result of absorbing moisture when placed in contact with the frankfurts. For this purpose I have found that relatively light cardboard or fibreboard serves very satisfactorily although other materials such as a light plastic material may be employed. The cardboard may be sized and finished but preferably should not have a water-repellent surface or finish which would not absorb moisture. The wrapping band is formed with a central longitudinally extending panel section 14 of greater width with a pair of straps 15 of reduced width projecting from the two ends of the panel section. The straps are provided with interengaging fastening means such as the notches 16 which may be interengaged with each other when the band is formed into a closed loop. The combined length of the panel section and straps should be such that the band can encircle the desired number of frankfurts with the fastening means of the two straps secured together.

Figure 3:
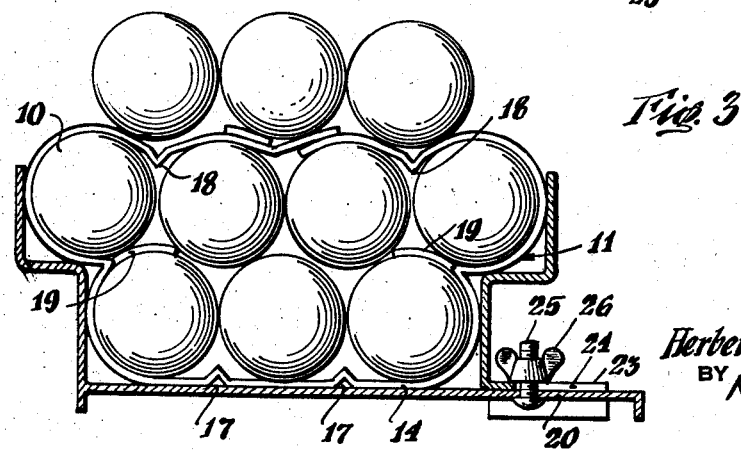
Fig. 3 is a cross-sectional view of the supporting form with the wrapping band and frankfurts positioned therein and showing the package in partially assembled condition.

The panel section is provided with a plurality of transverse crease lines or fold lines 17 to facilitate the creasing of the band at these points to permit the band to conform to the curvature of the frankfurts whereby the frankfurts may be nested in the band and retained in place. The number of fold lines 17 will vary with the number and arrangement of the frankfurts in the package. In the present instance, four fold lines are provided in the central panel section so as to provide three intermediate strips for supporting the three frankfurts at the base of the package and two end strips for extending upwardly along the sides of the package. I also provide similar crease lines or fold lines 18 transversely of the straps 15 adjacent the point of connection with the central panel section. The crease lines 18 together with the notches 16 are located between the four frankfurts in the intermediate row of the completed package and facilitate folding or bending of the band at these points so that it may conform with the curvature of the frankfurts. The band 11 also is preferably provided with tabs 19 which are formed integral with the panel section and are cut out of the two end strips thereof, as shown. The tabs are hingedly connected to the panel section 14 at the two outer transverse crease lines 17 and the free ends of the tabs extend towards the two ends of the band. In the finished package the tabs 19 are arranged to overlap the upper surface of the two outside frankfurts in the base row of frankfurts as shown in Figs. 3 and 6.

Figure 2:
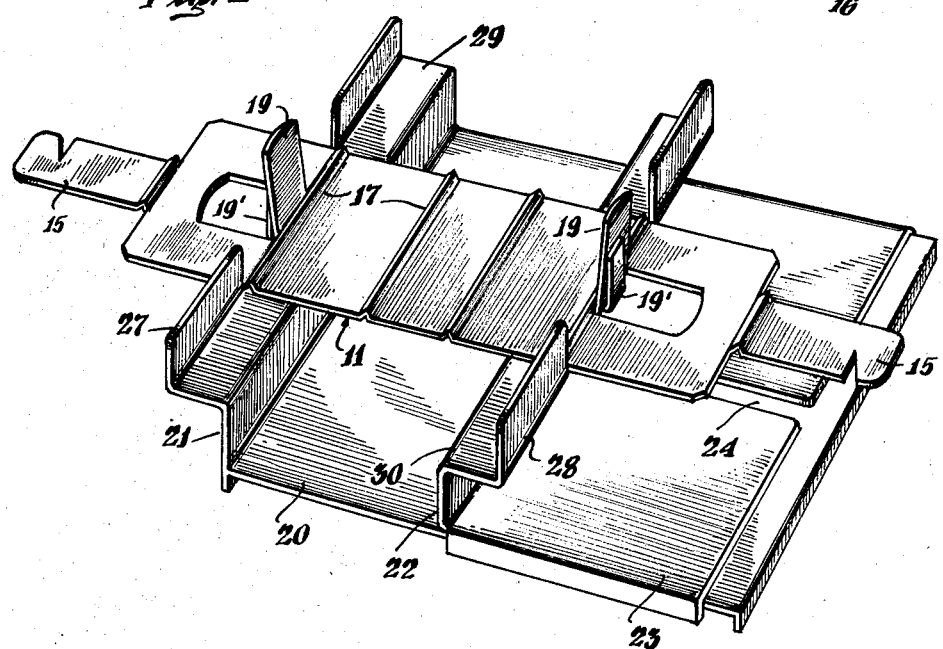
Fig. 2 is a perspective view of an adjustable supporting form which may be used in making a package in accordance with my invention showing the wrapping band positioned therein.

The next step in wrapping the package is to support the wrapping band so that the frankfurts may be arranged thereon in the desired pre-determined relationship. In this connection the band may be manually supported in one hand on a table while the frankfurts are arranged thereon. However, I have found that this may be more conveniently accomplished by employing a suitable form such as the adjustable form shown in Figs. 2 and 3. The illustrated form comprises a base plate 20 having a fixed flange 21 projecting upwardly along one edge and an adjustable flange 22 mounted on plate 23 which has sliding engagement with the base plate 20 so that the flange 22 may be shifted towards and away from the fixed flange 21. The plate 23 may be provided with a slot 24 through which the threaded stud 25, fixedly mounted on base plate 20, extends. A wing nut 26 is threaded to the stud 25 and it may be loosened to permit adjustment of the plate 23 and flange 22 and may be tightened to retain these parts in fixed adjusted position. The flanges 21 and 22 each have a lower vertical portion which is of the same height as the frankfurt or other product being wrapped. Each of the flanges also have an upper vertical portion 27 and 28, respectively, connected to the lower flange portion by a horizontal platform or step portion 29 and 30, respectively.

In using the adjustable form in making a package with the wrapping band 11, I first adjust the distance between the flanges 27 and 28 to the approximate distance between the outermost transverse crease lines 17 formed in the central panel of the band and the band is inserted between the flanges 27 and 28 in the manner shown bridging the central portion of the form with the two tabs 19 deflected upwardly at right angles to the central portion of the panel by prongs 19'. It should be understood, of course, that the wing nut 26 is tightened so as to maintain the flanges in the desired adjusted position. When the form and band are thus arranged, three frankfurts are placed thereon in parallel relationship extending transversely of the wrapping band with one frankfurt resting on each of the strips between the transverse fold line 17. Thereafter, the three frankfurts and the band are shifted to the position shown in Fig. 3, the tabs 19 are folded inwardly over the two outer frankfurts, also as shown in Fig. 3, and a row of four frankfurts are then superimposed upon the lower row of frankfurts between the two vertical flange portions 27 and 28. The upturned end portions of the two ends of the wrapping band are bent outwardly to accommodate the four frankfurts. The strap portions 15 of the wrapping band are then folded inwardly over the second row of frankfurts and the locking recesses 16 are brought into engagement with each other with the result that the wrapping band is formed into a loop which surrounds a group of the frankfurts, retaining them in parallel, proximate relationship. Thereafter, three additional frankfurts may be superimposed upon the intermediate row of frankfurts and these likewise are arranged in proximate, parallel relationship to each other as well as to the other frankfurts. In this connection it should be understood that the additional frankfurts may be superimposed upon the banded frankfurts either before or after the banded frankfurts have been removed from the adjustable form. The fact that several of the frankfurts are added after banding the initial group of frankfurts presents the advantage that frankfurts of the desired size can be selected and, if necessary, readily replaced by other frankfurts in order to permit the desired weight to be attained. Thus, if upon weighing it appears that the first group of frankfurts exceeds the weight tolerance, the three uppermost frankfurts may be readily replaced and three smaller frankfurts substituted in their place. After the desired weight has been attained and when the frankfurts are arranged as shown, they are then encased in an outer wrapping which serves to protect the frankfurts and also to retain them in the desired pre-determined arrangement.

I prefer to use sheet wrapping material rather than a pre-formed envelope in wrapping the frankfurts since this is relatively less expensive and permits the formation of an attractive outer wrapping free from wrinkles. The sheet of wrapping material should have a width greater than the circumferece of the package and should have a length greater than the length of the package. I prefer to employ a wrapper made of a plastic material which will shrink when heated to a temperature lower than the boiling point of water and will also seal when two surfaces of the material in contact with each other are heated.

Various plastic wrapping materials are available having plasticizers which will become tacky and will thus seal together when heated to a temperature lower than the boiling point of water, i.e., between 180° F. and 212° F. For this purpose I prefer to employ a polyvinylidene chloride wrapping material sold commercially under the trademark "Cry-O-Vac." However, other wrapping materials having similar characteristics may also be employed such as the polyvinylidene chloride wrapping material sold commercially under the trademark "Saran," and the rubber hydrochloride wrapping material sold commercially under the trademark "Pliofilm."

The sheet of wrapping material 12 is first wrapped around the circumference of the package with the longitudinal marginal edge portions thereof arranged in overlapping contacting relationship as shown at 32 and with the ends of the material projecting beyond the two ends of the package. The longitudinal overlapping marginal edge portions are suitably sealed as being heat sealed together in any suitable manner, preferably by applying hot water under pressure thereto preferably at a temperature between 180° F. and 212° F. The overlapping marginal edge portions are thus heat sealed for substantially their entire length and either one or both ends of the wrapping material may be left open. Thereafter, the interior of the package is preferably evacuated of substantially all of the free air therein by connecting one of the open end portions to a source of vacuum while holding the other end closed. The two ends are then closed and sealed in suitable fashion as, for instance, by twisting, as shown at 33 in Fig. 5. When the wrapping material is initially wrapped around the circumference of the package and the longitudinal overlapping edges are sealed together, the wrapper fits rather loosely around the package as shown in Fig. 4 and while the band 11 encircles the lower group of frankfurts, it will be seen that it does not conform exactly to the curvature of the individual frankfurts. The wrapping band is sufficiently yielding that when the vacuum is drawn in the package the outer wrapper 12 and the wrapping band 11 are pulled inwardly causing the wrapping band to conform to the curvature of the individual frankfurts as shown in Fig. 6 with the result that the frankfurts are nested in and partially embraced by the wrapping band. In this connection, the wrapping band 11 is moistened by contact with the frankfurts and becomes more yielding and will accordingly conform more completely with the curvature thereof. In addition, the inturned creases 17 are positioned between the frankfurts and facilitate the bending of the band to conform with the curvature of the frankfurts. This arrangement together with the upturned creases 17 serves to retain the frankfurts in the desired pre-determined relationship. It will be seen that the upper row of frankfurts are nested in the notch-like cavities formed between the frankfurts in the intermediate layer serving to hold the uppermost row of frankfurts in place.

When the ends of the wrapper have been closed and sealed, the interior of the package is substantially protected from the atmosphere. However, it will be found that the wrapper fits rather loosely and has a number of wrinkles therein. To overcome this condition I prefer to shrink the wrapper by subjecting it to heat in any suitable manner as, for instance, by immersing or spraying with hot water at approximately 200° F. The wrapper then shrinks sufficiently to eliminate the unsightly wrinkles. Due to the vacuum in the interior of the package the wrapper is still drawn inwardly to some extent between the individual frankfurts and the wrapper conforms to the curvature of the individual frankfurts as shown in Figs. 5 and 6. The shrinking of the wrapper also serves to retain the twisted end portions 33 in tightly twisted relationship maintaining the seal at this point. In this connection the material in the twisted end portions is stretched beyond its elastic limit but short of its yield point so that the twisted material is pulled in tightly against the package and the tendency to untwist is substantially eliminated.

It will be appreciated that the band may be varied in size to permit the formation of packages of different sizes. Thus, in Fig. 7 I have shown a somewhat smaller wrapping band 11' which may be used to make a package such as shown in Fig. 8 which only accommodates seven frankfurts. The wrapping band 11' has a central panel portion 34 with strap portions 35 projecting from the two ends thereof and provided with suitable fasten- means such as the locking recesses or notches 36. Crease lines 37 are formed transversely of the central panel section 34 so as to divide the panel into four separate strips, each adapted to accommodate one frankfurt. Transverse crease lines 38 are also provided in the strap portions 35 at the point of connection with the central panel portion. The adjustable form shown in Figs. 2 and 3 may also be used in assembling a package with the wrapping band 11'. In this case, however, the flanges 21 and 22 are spaced apart a sufficient distance to accommodate four frankfurts and after the wing nut 26 has been tightened the band 11' is placed therein. Four frankfurts are assembled thereon in proximate, parallel relationship and the wrapping and is formed in a loop and the strap portions 35 are brought together and secured together over the top of the four frankfurts as indicated in Fig. 8. Thereafter, three additional frankfurts may be superimposed on top of the four base frankfurts encased in the wrapping band and checked as to weight. If the group of frankfurts is too heavy or too light, the three superimposed frankfurts may be replaced with frankfurts of a different size until the desired weight is made.

The assembled frankfurts are then encased in a sheet of wrapping material 12, of the type previously described, and the same wrapping procedure as described above is followed. The completed package after evacuation and closing, sealing and shrinking of the wrapper presents the appearance shown in Fig. 8. The wrapping band partially embraces the individual frankfurts in the lowermost row and the frankfurts are nested therein. The upper row of frankfurts are nested in the space between the frankfurts in the lower row. The wrapper tightly enmbraces the individual frankfurts, as shown, and serves not only to protect the frankfurts from the atmosphere but also to retain them in the desired pre-determined relationship. The wrapping band forms a convenient label which is held in a fixed position which may be readily seen by the customer. Suitable advertising and instructional material may be displayed thereon.

It will thus be seen that I have provided an improved package for a prduct having a curved cross-sectional shape such as a frankfurt or other sausage product as well as a new and improved method of making the same and a new and improved wrapping band for use therewith. Modifications may be made in the illustrated and described embodiments of my invention without departing from the invention as set forth in the accompanying claims.

I claim:

1. A wrapping band for use in wrapping a plurality of sausage products within the same package comprising a strip of fibrous material selected from the group consisting of cardboard and fiberboard of sufficient strength and stiffness to support and retain the products in parallel relationship but being sufficiently yieldable when moistened by contact with the products to conform to the curvature thereof, said strip being formed with an elongated central panel section and with a pair of strap portions of lesser width connected to the ends of the panel section, said panel section having transverse crease lines formed therein dividing the panel section into transverse strips for supporting and partially embracing the individual sausage products and said strap portions having transverse crease lines and also having interengaging fastening means adjacent their respective ends whereby the band may be formed into a loop for embracing a group of the sausage products arranged in parallel relationship and with the crease lines arranged to project inwardly so as to help position the sausage products.

2. A wrapping band for use in wrapping a plurality of sausage products as set forth in claim 1 in which said panel section is also formed with longitudinally extending tabs, each of said tabs being integrally connected at one end to the panel section and being deformable with respect to the panel section so that it may be arranged to partially embrace one of the sausage products.

3. A packaged sausage product comprising: a plurality of sausage products arranged in proximate, parallel relationship with each other; and an elongated band formed into a loop and surrounding a plurality of said sausage products and made of a fibrous material selected from the group consisting of cardboard and fiberboard of sufficient strength and stiffness to support the said products and retain them in parallel relationship but being sufficiently yieldable when moistened by contact with the products to conform to the curvature thereof, said band being formed with an elongated central panel section and with a pair of strap portions of lesser width connected to the ends of the panel section, said panel section having transverse crease lines formed therein projecting inwardly between adjacent sausage products and dividing the panel section into transverse strips which partially embrace the individual sausage products and said strap portions having interengaging fastening means adjacent their respective ends serving to secure the band in the form of a closed loop.

4. A packaged sausage product comprising: a plurality of sausage products arranged in proximate, parallel relationship with each other; an elongated band formed into a loop and surrounding a plurality of said sausage products and made of a fibrous material selected from the group consisting of cardboard and fiberboard of sufficient strength and stiffness to support the said products and retain them in parallel relationship but being sufficiently yieldable when moistened by contact with with the products to conform to the curvature thereof, said band being formed with an elongated central panel section and with a pair of strap portions of lesser width connected to the ends of the panel section, said panel section having transverse crease lines formed therein projecting inwardly between adjacent sausage products and dividing the panel section into transverse strips which partially embrace the individual sausage products and said strap portions having interengaging fastening means adjacent their respective ends serving to secure the band in the form of a closed loop; and a wrapping of flexible material encasing said sausage products and band, said wrapping being in the form of a sheet having a width greater than the circumference of the package wrapped around the circumference of the package with longitudinal marginal edge portions in sealed contacting relationship and with its two ends projecting beyond the ends of the package and being closed and sealed, said wrapping being impermeable to and unaffected by air and the contents of the package and said package being substantially evacuated so as to cause the wrapper to embrace and tightly engage the sausage products and band to help retain them in assembled relationship.

5. A packaged sausage product as set forth in claim 4 in which less than all of the sausage products are surrounded by the elongated band and a plurality of the sausage products are also disposed outside of the band.

6. A packaged sausage product as set forth in claim 4 in which the wrapping is made of a material which shrinks when subjected to an elevated temperature and the wrapping material is tightly stretched around the sausage products conforming to the curvature thereof and being substantially free from wrinkles.

7. A packaged sausage product comprising: an elongated wrapping band made of a strip of flexible fibrous material selected from the group of cardboard and fiberboard having a plurality of transverse crease lines and formed in a loop; a plurality of sausage products arranged in proximate parallel relationship disposed inside said loop with the transverse crease lines of said band projecting inwardly between the sausage products so that the sausage products are held in position by said loop and a plurality of sausage products arranged in proximate parallel relationship disposed outside of said loop and disposed on top of the other sausage products so as to be supported thereby and being in alignment with and nested in the space between the immediately adjacent sausage products disposed inside the loop; and a wrapping of material of the type which shrinks when subjected to heat and which will seal when two contacting surfaces thereof are subjected to heat in the form of a sheet extending completely around the said sausage products and band so as to protect the sausage products from exposure to the atmosphere and so as to hold them in relatively predetermined relationship with the longitudinal edges of said sheet material being in overlapping relationship and sealed together and with the ends of said wrapping material protruding beyond the ends of said sausage products and being in closed sealed relationship, the interior of said package being substantially evacuated and said wrapping material being stretched tightly around the sausage products and wrapping band.

8. The method of making a packaged sausage product which comprises: first providing a wrapping band in the form of an elongated flexible strip having a plurality of transverse crease lines; then assembling a plurality of sausage products on said band in proximate, parallel relationship with the transverse crease lines of said band projecting inwardly between the sausage products to help position them and securing said band around said sausage products so as to retain them in place; then placing a plurality of sausage products on top of the first mentioned sausage products outside of said band and in proximate, parallel relationship to each other and to said other sausage products until a desired pre-determined weight has been attained; and finally providing a sheet of wrapping material having a width greater than the circumference of the package and a length greater than the length of the package and made of a material which will shrink when subjected to heat and which will seal when two connecting surfaces thereof are subjected to heat, wrapping said sheet of wrapping material around the circumference of the package so as to encase all of the sausage products and the wrapping band and so that the longitudinal marginal edge portions of the wrapper are in contacting relationship, subjecting said contacting marginal edge portions to heat so as to seal them together, substantially evacuating said package and closing and sealing the end portions of the wrapping material, and subjecting said entire wrapper to heat so as to cause it to shrink and stretch tightly around the sausage products conforming to the curvature thereof to help retain the sausage products in assembled relationship and substantially eliminating the wrinkles.

References Cited in the file of this patent

UNITED STATES PATENTS

| | | |
|---|---|---|
| 1,840,425 | Andrews | Jan. 12, 1932 |
| 1,906,183 | Vogt | Apr. 25, 1933 |
| 1,913,134 | Tilney | June 6, 1933 |
| 2,001,478 | Vogt | May 14, 1935 |
| 2,125,246 | Meyer | July 26, 1938 |
| 2,379,934 | Seiferth | July 10, 1945 |
| 2,545,243 | Rumsey | Mar. 31, 1951 |
| 2,678,770 | Bonini | May 18, 1954 |
| 2,713,449 | Carmichael | July 19, 1955 |
| 2,744,020 | Seiferth | May 1, 1956 |